Patented Apr. 2, 1940

2,195,549

UNITED STATES PATENT OFFICE 2,195,549

BLENDING AGENT FOR LUBRICATING OILS

Jones I. Wasson, Elizabeth, N. J., assignor to Standard Oil Development Company, a corporation of Delaware No Drawing. Application December 24, 1936, Serial No. 117,536

12 Claims. (Cl. 87—9)

The present invention relates to an improved blending agent for lubricating oils and to oils containing the said agent which are especially desirable as gear and transmission oils, and for other purposes, and to a method for producing such oils.

Gear and transmission oils are generally largely hydrocarbon oils to which have been added an addition agent such as sulfur, and various sulfur compounds, lead compounds and other materials containing metals to give the oils extreme pressure characteristics. The majority of these oils are of relatively low viscosity index, that is to say, they lose viscosity very rapidly with rising temperature. This is necessary in most cases because the particular agents had not dissolved in the higher class oils of higher viscosity index. It is desirable, therefore, to produce oils of higher viscosity index than can be obtained from the lower grade petroleum oils, and if possible, to produce oils having a viscosity index above that available in petroleum. The oil should, of course, at the same time be endowed with extreme pressure properties and relatively low pour point not above 15° F., and above all must be capable of withstanding severe service without decomposition due to the breakdown of oxidation and the like.

According to the present invention an oil of the above exacting specifications is prepared relatively cheaply by first producing a suitable polymer addition agent, then sulfurizing same and adding it to a suitable hydrocarbon base stock.

The addition agent is prepared by polymerizing a suitable fatty oil selected from the class of semi-drying or slow drying oils. The rapid oils which are the types used in paints and varnishes, for example linseed or tung, or China-wood oil, are unsatisfactory for the present purpose, because they polymerize too rapidly and become insoluble in lubricating oils which causes a settling out of a sediment, and furthermore, they continue to polymerize or thicken during use. The preferred fatty oil for the present purpose is rape seed oil but equivalents of substantially the same properties can be found in the mustard seed oils, and blended oils can be produced to approximate the properties of rape seed oil. It is also possible to blend rape seed oil with relatively cheaper oils, as will be understood.

Polymerization may be brought about in any desired manner under suitable conditions so that the rate and degree of polymerization can be controlled as to prevent the formation of insoluble materials of a gummy nature which, of course, will be eventually formed if polymerization proceeded too far. The polymerization may thus be accomplished by the action of heat alone while the oil is maintained under considerably reduced pressure. The temperature necessary for the reaction varies from a rather wide range from, say 550° F. to 625° F., and the time is in inverse proportion to the temperature. The nature of the reaction is not fully understood but the oil polymerizes relatively slowly and the reaction can be controlled accurately and stopped at any point desired. It is desirable to add a relatively small amount of sulfur, say, ½ to 1½%, prior to the heating step, which for unknown reasons makes the reaction progress more smoothly and produces a more soluble and stable product. It also appears to permit polymerization to a higher degree without the formation of insoluble materials.

Polymerization may also be effected by subjecting the oil to an alternating electric glow discharge. This is accomplished by passing a high voltage alternating current through the oil while maintained at high vacuum. The conditions for this type of polymerization are well known and need not be further detailed, but it is desirable to pass a current of hydrogen through the apparatus during the electrical treatment.

Polymerization may be effected with chemical catalytic agents such as the active halides preferably the chlorides of metals, such as aluminum, zinc, or of metalloids such as boron fluoride. A somewhat different class of polymerizing agents may also be used, such as sulfur mono- or sulfur dichloride. These materials, under known conditions, are capable of effecting polymerization without substantial sulfurization and it will be understood that such conditions are preferably employed.

Whatever the method or conditions under which polymerization is effected, it should be continued so as to obtain a substantial thickening of the oil to at least a viscosity of 100 seconds Saybolt at 210° F., but preferably of at least 300 to 1000 seconds Saybolt.

The second step in the improved process consists of sulfurizing the polymer produced above. This is accomplished by adding enough sulfur content so that when added to suitable base stocks, it will furnish from ⅓ to 3% of sulfur. Ordinarily, 1% of sulfur in the finished oil will give good results, and if the oil is to be blended in proportion to, say, 20%, then it will be necessary to sulfurize the polymer to the extent of about 5% in order to produce 1% of sulfur in the finished product, as will be understood. Sulfurization, by which is meant chemical combination with the sulfur, may be accomplished by merely heating the polymer and the sulfur to a temperature from about 400° F. to 550° F., until sulfurization is complete which generally takes from about 1 to 3 or more hours. The oil is digested for a short time at a temperature of 275° F. to 300° F. in order to thoroughly incorporate the sulfur. This method produces a clear, clean and highly desirable polymer, if the temperature is not too high and the sulfurizing is carefully carried out. The sulfurization may likewise be conducted at lower temperatures by the action of sulfur chlorides, preferably under such conditions as will produce sulfurization rather than additional polymerization.

The third step in the process is the addition of sulfurized polymer to the mineral oil base in which it is to be used. It is possible to add unsulfurized polymer to the base oil and then to sulfurize, but it is much preferred to carry out the process in the way mentioned above. The ingredients can be blended at ordinary room temperature. The proportion of the polymer, of course, varies with the requirements for the finished oil. In general the amount of polymer should vary from, say 10 to 40% of the final composition. The polymer is more viscous than the base oil and, therefore, increases its viscosity as well as bringing the viscosity index of the base stock above that shown by petroleum products. In choosing the base stock, it is preferable to use dewaxed distillate fractions from paraffin or mixed crudes, or from solvent extracted oils, so as to obtain the greatest possible increase in viscosity index on adding the polymer.

*Example 1.*—1% of sulfur is added to rape seed oil which is heated for eight hours at a temperature of 590° F. while under vacuum of 10 mm. of mercury. The oil thickens rapidly and heating is discontinued when a small sample shows a viscosity of approximately 500 seconds Saybolt at 210° F. Five parts of sulfur in the form of flowers of sulfur were then added to the oil which was still hot and was digested for two hours until the sulfur was thoroughly incorporated and then was cooled. The polymer has the following inspection:

Viscosity at 210° F_____ 522 Sec. Saybolt
Sulfur _____ 4.0

The polymer was then added to a mineral oil in proportion of four parts of the mineral oil to one part of the polymer. The final inspection of this product is as follows:

Viscosity at 100° F_____ 673 Sec. Saybolt
Viscosity at 210° F_____ 82 Sec. Saybolt
Viscosity index at_____ 117
Pour point_____ 10
Sulfur _____ 1.1%

This material is of excellent color and does not discolor a copper strip under the conditions of the ordinary corrosion test, and showed a high degree of stability.

*Example 2.*—The second sample of the sulfurized polymer prepared as in the previous example, was added to a hydrocarbon lubricating oil, SAE 40. The polymer amounted to 20% of the blend and the inspection of the product was:

Viscosity at 100° F_____ 801
Viscosity at 210° F_____ 85.4
Sulfur_____ 1.1%

The blend was then run for 48 hours in a Chevrolet transmission under conditions equivalent to a speed of 65 miles per hour. After that the viscosity of the oil was found to be 799 sec. at 100° F. and 85.9 at 210° F., demonstrating that the product was stable under this severe test.

*Example 3.*—Rape seed oil was polymerized with boron fluoride at approximately 80° F. The reaction was complete in 24 hours and the product after inspection had a viscosity of 306 sec. Saybolt at 210° F.

This material was heated with 3% of sulfur at 300° F. for 2 hours, and on inspection showed a viscosity of 383 sec. Saybolt. When blended in the proportion of 1 part of the above with 2 to 4 parts of mineral oil, a high grade extreme pressure oil was obtained.

I claim:

1. An improved lubricant comprising a hydrocarbon lubricating oil base and a sulfurized polymer of a semi-drying oil dissolved in said lubricating oil base, the said polymer being characterized by a partial polymerization to a point short of oil insolubility in the presence of small portions of sulfur and under reduced pressure.

2. An improved lubricant, comprising a hydrocarbon lubricating oil base with 10 to 40% of a polymer of a semi-drying oil freely soluble therein and sulfurized so as to furnish at least 0.5% sulfur in the final product the said polymer being characterized by a partial polymerization to a point short of oil insolubility in the presence of sulfur and under reduced pressure.

3. An improved lubricant comprising a hydrocarbon lubricating oil base with 10 to 40% of a polymer of a semi-drying oil, said polymer having a viscosity of at least 100 seconds Saybolt, being freely soluble in a hydrocarbon oil and sulfurized so as to give from 0.5% to 3% or more sulfur in the final product the said polymer being characterized by a partial polymerization to a point short of oil insolubility in the presence of sulfur and under reduced pressure.

4. A composition according to claim 3 in which the polymer is prepared by heating semi-drying oil to a temperature between 550° and 650° F., for a prolonged period.

5. A composition comprising a hydrocarbon lubricating oil base with 10% to 40% of a polymer of a semi-drying oil, said polymer having a viscosity of at least 100 seconds Saybolt, being freely soluble in said hydrocarbon oil and sulfurized so as to give from 0.5% to 3% or more sulfur in the final produce in which the polymer is prepared by subjecting a semi-drying oil in an alternating electric glow discharge for a prolonged period.

6. A composition according to claim 3 in which the polymer is prepared by the action of a chemical catalyzing agent.

7. An improved lubricant for gear and transmission apparatus, comprising a hydrocarbon lubricating oil base of low pour point, in combination with from 10 to 40% of a polymer of rape seed oil, said polymer having a viscosity from about 300 to 1000 seconds Saybolt at 210° F., freely soluble in the hydrocarbon oil and sulfurized so as to furnish from 0.5% to 3% sulfur in the final product the said polymer being characterized by a partial polymerization to a point short of oil insolubility in the presence of sulfur and under reduced pressure.

8. An improved process for producing a gear and transmission oil, comprising the steps of polymerizing a semi-drying oil to from 100 to 1000 seconds Saybolt at 210° F., sulfurizing the polymer so as to furnish from 0.5% to 3% or more sulfur in the final product and adding the same to a mineral oil base, the said polymer being characterized by a partial polymerization to a point short of oil insolubility in the presence of sulfur and under reduced pressure.

9. An improved process for producing gear and transmission oil, comprising the steps of polymerizing a rape seed oil to a viscosity from about 300 to 1000 seconds Saybolt at 210° F., adding free sulfur to the oil and digesting the same at an elevated temperature, then blending the sulfurized polymer in a mineral oil base in proportion from about 10% to 40% of polymer in the final product, the degree of sulfurization being adapted to the proportion of the polymer and the base oil so that the final product has from 0.5% to 3% sulfur, the said polymer being characterized by a partial polymerization to a point short of oil insolubility in the presence of sulfur and under reduced pressure.

10. An improved process for producing improved sulfurized oils comprising polymerizing the semi-drying oil in the presence of a small amount of sulfur say from about ½ to 1½% for a time sufficient to obtain a viscosity between about 300 and 1,000 seconds Saybolt at 210° F., then sulfurizing the polymer with an additional amount of free sulfur and blending the product with the mineral oil, the said polymer being characterized by a partial polymerization to a point short of oil insolubility in the presence of sulfur and under reduced pressure.

11. An improved process for the production of lubricating oils comprising in combination the steps of treating a semi-drying oil at elevated temperature and reduced pressure in the presence of small proportions of sulfur to polymerize the semi-drying oil, limiting the time of polymerization to obtain an optimum polymerization short of complete polymerization to retain the characteristic of oil solubility in the polymer, thereafter further sulfurizing the polymer by the incorporation therein of additional quantities of sulfur, and dissolving the sulfurized polymer in a hydrocarbon oil base.

12. An improved process for the production of lubricating oils comprising in combination the steps of treating rape seed oil at elevated temperature ranging between 550° F. and 625° F. and under reduced pressure in the presence of small proportions of sulfur to polymerize the rape seed oil, limiting the time of polymerization to obtain a maximum polymerization short of complete polymerization to retain the characteristic of oil solubility in the polymer, thereafter further sulfurizing the polymer by the incorporation therein of additional quantities of sulfur, and dissolving the sulfurized polymer in a hydrocarbon oil base.

JONES I. WASSON.